Nov. 29, 1938.　　　　R. N. ROWE　　　　2,138,408
FLUSH PANEL MOUNTING FOR ELECTRICAL DEVICES
Filed May 15, 1937　　　2 Sheets-Sheet 1
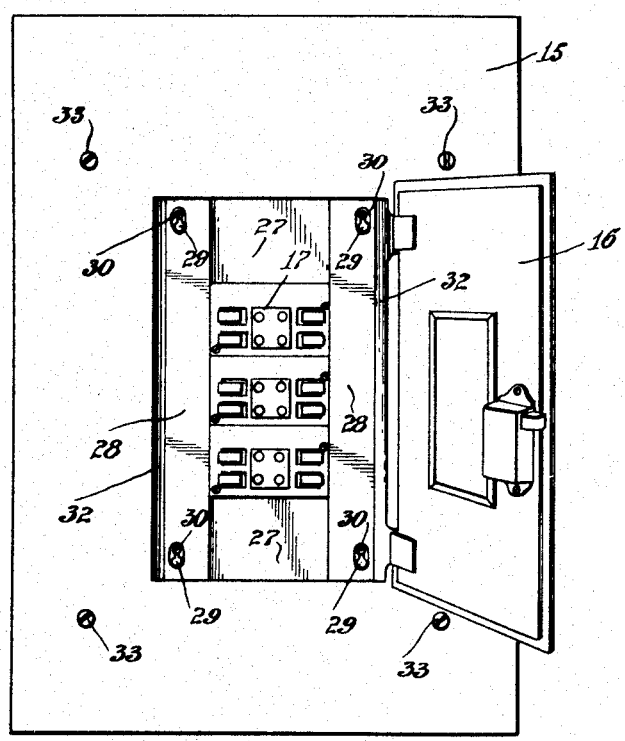
Fig. 1.
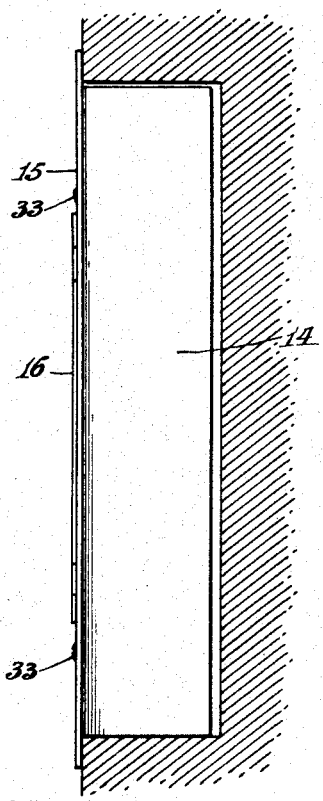
Fig. 2.
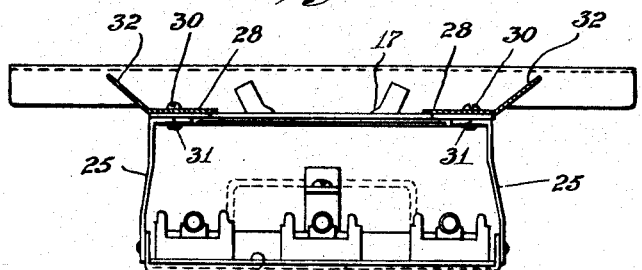
Fig. 3.
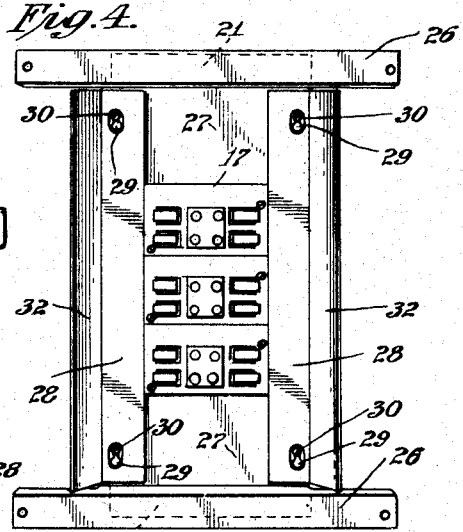
Fig. 4.
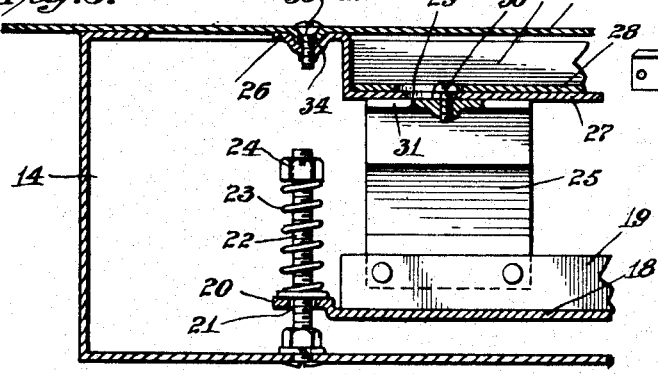
Fig. 5.
INVENTOR
Raymond N. Rowe
BY
ATTORNEY

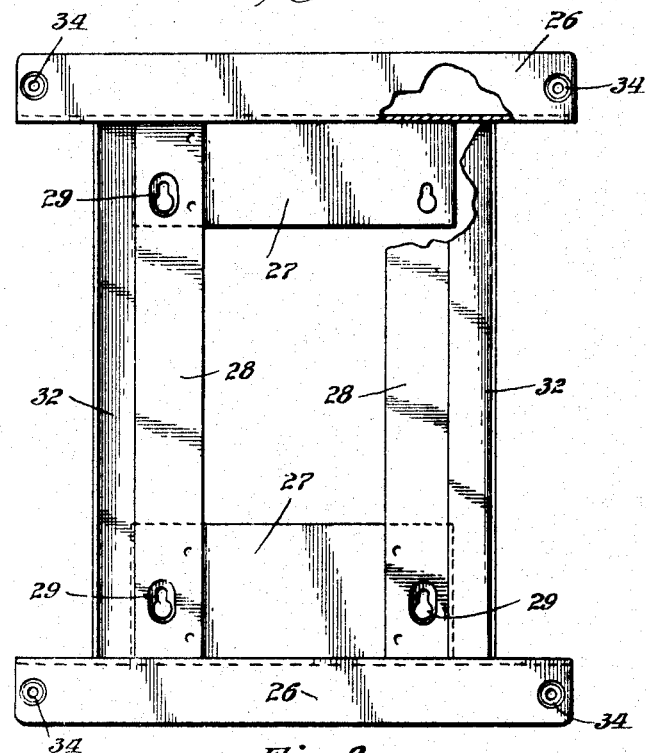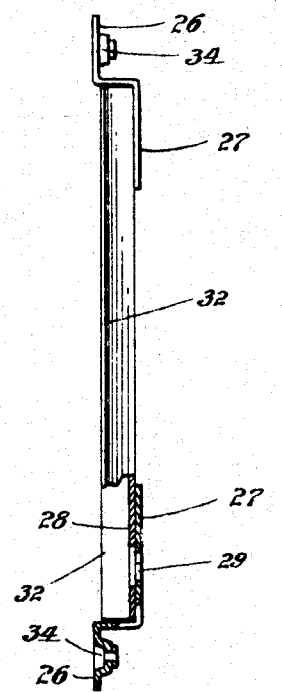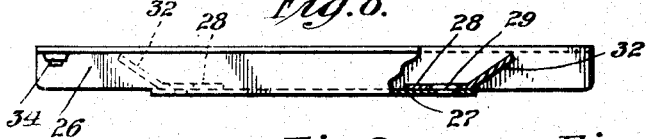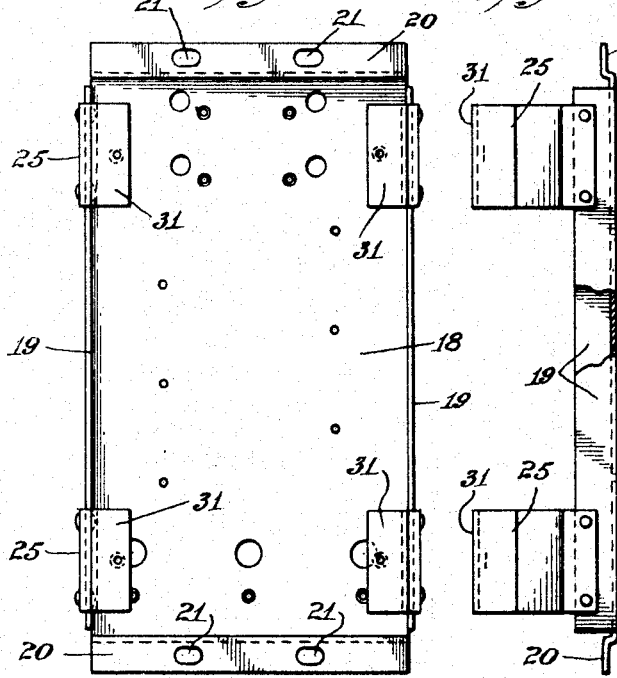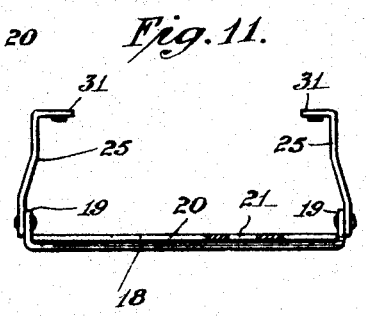

Patented Nov. 29, 1938

2,138,408

UNITED STATES PATENT OFFICE 2,138,408

FLUSH PANEL MOUNTING FOR ELECTRICAL DEVICES

Raymond N. Rowe, Plainville, Conn., assignor to The Trumbull Electric Manufacturing Company, Plainville, Conn., a corporation of Connecticut Application May 15, 1937, Serial No. 142,723

11 Claims. (Cl. 247—10)

My invention relates especially to cabinet or wall boxes for electric switches for circuit control or protective devices and similar devices.

The main object is to provide a construction which can be readily mounted in a wall with all the outward parts flush or parallel with the outer surface of the wall even where the box itself may not be plumb or true.

In its preferred form the invention contemplates the use of a conventional type of box and face plate with a door for access to the parts mounted within the box. The switch, circuit breakers or other electrical units are carried by a mounting pan which is guided on posts which project forwardly from the bottom of the box. Springs on these posts tend to press the pan backwardly toward the bottom of the box. A barrier frame or trim piece is supported by brackets which project forwardly from the corners of the mounting pan. The face plate is secured in place by screws which pass through the face plate into corners of the barrier frame and thus at the same time draw the panel mounting pan with its electrical units toward the face plate and the face plate against the wall or the edges of the box whichever projects outwardly the most. Of course the box should be set back slightly in the wall.

Details of one form of device are shown in the accompanying two sheets of drawings.

Fig. 1 is a front view of a device embodying one form of my invention, the door of the box or cabinet being shown open.

Fig. 2 is a side and sectional view showing the box in a wall.

Fig. 3 is an end elevation with parts in section.

Fig. 4 is a front view of the interior barrier frame and mounting pan with switch units attached.

Fig. 5 is an enlarged sectional view showing one corner of the box with the support and connections.

Fig. 6 is a front view of the barrier frame part being broken away.

Fig. 7 is a side edge and partial vertical sectional view of the barrier frame.

Fig. 8 is a plan and partial sectional view of the frame.

Fig. 9 is a front view of the mounting pan.

Fig. 10 is a side view of the same, a part being shown in section.

Fig. 11 is a bottom plan view of the same.

The box 14 and face plate 15 may be of any suitable type and provided with a hinged door 16.

The switch, circuit breaker or other units 17 are suitably secured to a back plate 18 which preferably has flanges 19 so as to form a sort of pan. This has end flanges or extensions 20 with holes 21 to accommodate posts 22 which are secured to the bottom of the box. Springs 23 on these posts press against the extension flanges 20. The pressure may be varied by the nuts 24 which are adjustable on the screw threaded posts.

At the corners of the mounting pan 18 are brackets 25 for supporting the barrier frame. This frame consists of end bars 26 having depressed platforms 27 to which the side bars 28 are secured for instance by welding. These platforms 27 have key hole slots 29 to receive screws 30 which take into the inturned ears 31 of the respective brackets 25.

Each side bar 28 has an outwardly flaring wing 32 adapted to approach or engage the rear face of the face plate 15. By having these wings resilient they may be brought into snug contact with the body of the face plate.

The entire panel mounting and barrier frame are adapted to be drawn toward the face plate by screws 33 which pass through the face plate and engage in the screw seats 34 in the ends of the end bars 26 of the barrier frame.

In practice the switch or other electrical units are first mounted or assembled in the pan 18. This is then mounted upon the posts 22 in the box which may have already been mounted in the wall. The barrier frame is then mounted on the posts of the mounting pan and secured thereto. The face plate 15 is then applied and secured in place by screws 33. The device may all be wired or connected in circuit before placing the barrier frame.

I claim:

1. A flush panel mounting including a box having guide posts in the bottom thereof, a mounting pan for the units guided on said posts, springs pressing said pan toward the bottom of the box, a barrier frame detachably secured to said pan, a face plate for the box and screws passing through the face plate and engaging in the barrier frame for drawing the panel mounting pan and attached units toward the face plate and drawing the face plate toward the box.

2. A panel mounting for electrical units including a box, guide posts in the bottom thereof, a mounting device for the units guided on said posts, springs pressing said device toward the bottom of the box, a barrier frame secured to said device, a face plate for the box and means engaging the barrier frame and plate for drawing the panel mounting device and attached units toward the face plate and drawing the face plate toward the box.

3. A flush panel mounting including a box having guide means, a mounting pan guided to slide on said means, springs pressing said pan toward the bottom of the box, a barrier frame detachably secured to said pan, a face plate for the box and means passing through the face plate and engaging in the barrier frame for drawing the panel mounting pan toward the face plate and drawing the face plate toward the box.

4. A flush panel mounting including a box having guide posts, a mounting pan having extensions guided on said posts, springs pressing said pan toward the bottom of the box, a barrier frame detachably secured to said pan and having side wings, a face plate for the box and means passing through the face plate and engaging in the barrier frame for drawing the face plate toward the box and toward the side wings.

5. A flush panel mounting including a box having guide posts, a mounting pan movably supported by said posts, a barrier frame detachably secured to said pan, said pan and barrier frame forming a unitary structure and means for universally adjusting the position of said unitary structure interiorly of the box, said means including a pressure spring on each of said posts in engagement with the movable pan and pressing the pan and the parts supported thereby toward the bottom of the box and a nut on each post in engagement with the spring for varying the pressure thereon.

6. A flush panel mounting including a box having posts in the bottom thereof, a mounting pan movably supported by said posts, a barrier frame secured to said pan, said pan and barrier frame forming a unitary structure, means for initially universally adjusting the position of said unitary structure in the box, said means including a pressure spring on each of said posts in engagement with the movable pan and a nut on each post in engagement with the spring for compressing the spring and forcing the pan toward the bottom of the box, a face plate adapted to overlie said box and barrier frame and means for subsequent universal adjustment of the unitary structure relative to the face plate and to the box.

7. A flush panel mounting including a box having posts, a mounting pan movably supported by said posts, a barrier frame secured to said pan, said pan and barrier frame forming a unitary structure, means for initially universally adjusting the position of said unitary structure in the box, said means including a pressure spring on each of said posts in engagement with the movable pan and a nut on each post in engagement with the spring for compressing the spring and forcing the pan toward the bottom of the box, a face plate adapted to overlie said box and barrier frame and means for subsequent universal adjustment of the unitary structure relative to the face plate and to the box, said latter means including a screw connection between said plate and frame barrier.

8. A flush panel mounting including a box having guide posts in the bottom thereof, a movable mounting pan having extensions guided on said posts, springs pressing said pan toward the bottom of the box, means for adjusting the pressure on said springs, a barrier frame detachably secured to said pan, a face plate for the box and a screw passing through the face plate and engaging the barrier frame for drawing the face plate toward the frame and the frame toward the face plate.

9. A flush panel mounting including a box having guide posts, a movable mounting pan having extensions guided on said posts, springs pressing said pan toward the bottom of the box, a barrier frame, a slot and stud connection between the pan and barrier frame, resilient side wings extending outwardly from said frame, perforated end bars extending outwardly from said frame, and a face plate for the box yieldingly supported on said wings and rigidly connected to said end bars by a screw passing therethrough.

10. As an article of manufacture, a panel mounting including a pan for supporting electrical units, said pan having end extensions for guiding on posts in a box and having corner brackets extending forwardly from the bottom of the pan, a barrier frame supported by said brackets, said frame having side plates and connecting end plates, each end plate having an extension between the side plates and each side plate having a side wing.

11. As an article of manufacture, a panel mounting including a pan for supporting electrical units, said pan having end extensions for guiding on posts in a box and having corner brackets extending forwardly from the bottom of the pan, a barrier frame supported by said brackets, said frame having side plates and connecting end plates, each end plate having an extension between the side plates and each side plate having a side wing and means for securing the end plate to a face plate.

RAYMOND N. ROWE.